Sept. 29, 1970    R. J. BURNISTON    3,530,544
CABLE BUNDLING STRAP
Filed Oct. 30, 1967

INVENTOR
RAYMOND J. BURNISTON
BY David Teaslene
ATTORNEY

United States Patent Office 3,530,544
Patented Sept. 29, 1970

3,530,544
CABLE BUNDLING STRAP
Raymond J. Burniston, Madison Township, Middlesex County, N.J., assignor to The Thomas & Betts Co., Elizabeth, N.J., a corporation of New Jersey
Filed Oct. 30, 1967, Ser. No. 678,876
Int. Cl. B65d 63/00
U.S. Cl. 24—16                                6 Claims

ABSTRACT OF THE DISCLOSURE

This invention relates to bundling straps composed of three discrete elements. The first of these elements is a strap member having a length chosen in accordance with the purpose for which the strap is to be employed. The second element is a head member having an aperture extending therethrough and having therein a separator so as to separate the aperture into two discrete channels. A first end of the strap member is placed in a first of these channels, within the aperture of said head member, and the second portion of the strap member is then threaded about the objects to be bundled and then placed in the second channel of the head member. The third element, a metallic barb, is then driven through the assembled strap and head member such that the barb pierces first a wall of the head member then enters the two ends of the strap member and thence into a second opposite wall of the head member to complete the assembly of the bundling strap.

BACKGROUND OF THE INVENTION

Field of the invention

The invention is related to the field of bundling discrete articles to hold them in a desired relationship and will particularly find application in the field of bundling individual strands of wire into a uniform cable to facilitate the wiring of equipment or the routing of wires within equipment, or in its surrounding locations. Further, the invention finds particular use in the field of rockets and missiles, and other devices, which employ a liquid oxygen atmosphere producing low temperatures.

DESCRIPTION OF THE PRIOR ART

In U.S. Pat. 3,186,047, issued June 1, 1965, for a Self-Clinching Bundling Strap to Schwester there is described a self-clinching bundling strap which may be employed to hold a plurality of individual wires into a uniform cable. The device of the patent is fabricated from nylon, which at room temperatures, or within a reasonable temperature range therefrom, provides a great deal of strength and resistance to abrasion without damage to the articles or wires which are to be bundled. However, when this type of strap is to be employed, in a liquid oxygen environment, the poor low temperature characteristics of the nylon causes rapid deterioration and destruction of the strap. At low temperatures, the nylon material is brittle and cracks and there is little, or no, resiliency of the strap itself or of the metal barb used to hold the strap in the assembled position.

In an effort to overcome the deficiencies of the nylon, in such liquid oxygen environments, attempts were made to fabricate a similar type of strap, as that shown in the aforesaid patent, out of tetrafluoroethylene or polytetrafluoroethylene which show much greater ability to withstand a liquid oxygen environment and the resulting cold which is produced thereby. Such straps, however, fail to produce the desired results in that the characteristics of these materials interfere with the proper operation of the barb and strap as a whole. Firstly, the smoothness of these materials act as a lubricant and decrease the friction, between the barb and the strap itself, preventing a solid engagement between the barb and strap which is typical of the Schwester et al., device. Secondly, these materials are much softer than the nylon and so the barb tends to sink further into the head rather than piercing the strap during attempts to lock the strap against withdrawal. Thirdly, heads constructed from these materials distort and thus decrease the pull-out force required to withdraw the strap from the head after the bundling strap has been assembled.

SUMMARY OF THE INVENTION

In order to overcome the problems, which were described above with relation to the employment of tetrafluoroethylene or polytetrafluoroethylene materials, hereafter referred to as TFE and PTFE, respectively, in the form of bundling strap illustrated in the cited patent, the novel device, as disclosed herein, was developed. In this device the characteristics of the TFE and PTFE materials may be used to full advantage at liquid oxygen temperatures, resulting from a liquid oxygen environment, without permitting other properties of the materials from defeating the operation of the bundling device. In constructing a device in accordance with the invention, a head member, having an aperture therethrough and having two distinct channels, so as to keep separated two portions of the strap member which are passed therethrough, is employed with a metal barb which is driven through the head member through the looped strap end portions in such a manner as to firmly form the strap member into a loop about the articles to be bundled and to maintain the loop so formed.

In the usual manner of operation of the device a first end of the strap is placed into one of the channels in the aperture of said head member and the barb is driven through the top wall of the head member and thence into the end portion of the strap member. The second end of the strap, which may be tapered for ease in installation, is then passed about the plurality of articles to be bundled and inserted into the second channel in the aperture of the head member and pulled to the desired point of tightness. The barb is then driven through the second end portion of the strap member and into the opposite wall of the head member to firmly fix the looped relationship just established.

The head member may be formed with ribs extending from the center of the inner wall of the head means and projecting into the aperture, or it may be formed of a continuous web, or intermediate wall, extending across the aperture and running along the entire length of the head member. A further variation of the rib form will provide a rib with double-tapered shoulders to separate the head member into two channels. The barb may have a chisel point or may have a curved or serrated edge to permit its easy entrance into, and through, the various layers of strap material. It is therefore an object of this invention to provide an improved form of bundling strap which is capable of operating in a liquid oxygen environment and at temperatures resulting from such a liquid oxygen environment.

It is another object of this invention to provide an improved bundling strap employing TFE or PTFE, or similar materials, useful at the temperatures resulting from a liquid oxygen environment.

It is still another object of this invention to provide a bundling strap useful at the temperatures of a liquid oxygen environmental which is inexpensive to make an easy to assemble.

Other objects and features of the invention will be pointed out in the following description and claims and illustrated in the accompanying drawings, which disclose, by way of example, the principle of the invention, and the best mode which has been contemplated for carrying it out.

BRIEF DESCRIPTION OF THE DRAWINGS

Similar elements are given similar reference characters in each of the respective figures.

Turning now to FIGS. 1 and 2 there are shown in exploded form a bundling strap constructed in accordance with the concepts of the invention. The bundling strap consists of a strap portion 20 having a tapered tip portion 22 and a nontapered end portion 24. It should be noted that both ends of the strap 20 may be made tapered such as at 22 or both may be made nontapered as at 24. A head member 26, having two channels therein, as will be described below with reference to FIGS. 3 through 9, is assembled to the strap 20 by means of a metallic barb 28, in a matter to be described below.

Turning now to FIG. 3, the construction of the preferred form of the head member 26 is shown. The head member 26 consists of a top wall 30, a bottom wall 32, a left side wall 34 and a right side wall 36. The head member 26 is formed in a generally rectangular pattern and has an aperture extending through the length thereof.

Figures 3, 4, 5, 7, 9:
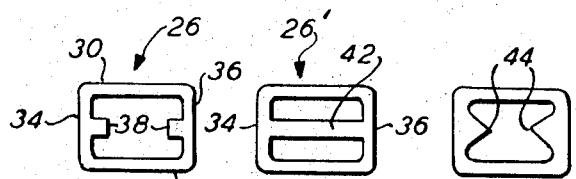
FIG. 3 is a front elevation of the head member of FIGS. 1 and 2.
FIG. 4 is a front elevational view of an alternative configuration of the head member of FIGS. 1 and 2.
FIG. 5 is a front elevational view of a further alternative embodiment of the head of FIGS. 1 and 2.
FIG. 7 is a sectional view of a partially assembled bundling strap taken along the lines 7—7 in FIG. 6.
FIG. 9 is a sectional view of a fully assembled bundling strap taken along the lines 9—9 in FIG. 8.
Figure 6:
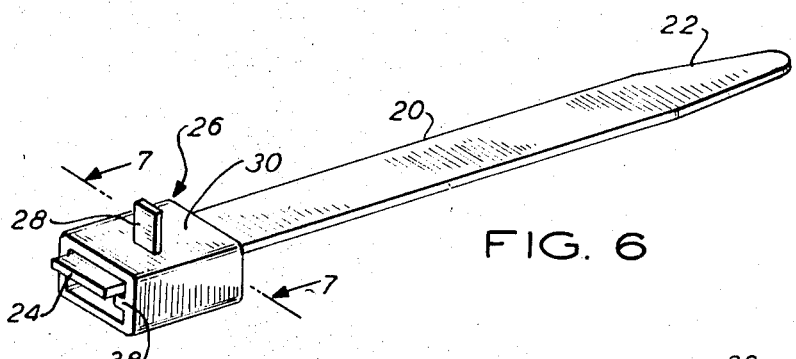
FIG. 6 is an isometric view of the bundling strap of FIGS. 1 and 2 partially assembled.

Extending also along the length of the head member 26, and extending into the aperture, are a pair of ribs 38. These ribs approximately bisect the height of the aperture within the head member 26 and will provide a shelf for the strap 20 which is inserted therein, as will be described below. As is shown in the FIG. 6, the strap member 20 is inserted at its end 24 into a first channel of the head member 26. This channel existing above the ribs 38 and below the inner surface of the top wall 30. The barb 28 is then driven through the top wall 30 and thence into the strap 20. The barb 28 does not pass through strap 20 but only enters it, causing it to bow in the region of the ribs 38 (as shown in FIG. 7). This bow prevents interference with the entrance of the tapered tail portion 22 of the strap 20 into the second channel formed between the ribs 38 and the inside surface of the bottom wall 32, as will be described below.

The relative positions of the strap 20, the head member 26, and the barb 28 in the assembled position, is shown in FIG. 7, which shows a sectional view of the head 26 taken along the lines 7—7. Turning now to FIG. 7, there is shown the strap 20 positioned in the channel between the ribs 38 and the inside surface of the upper wall 30 of the head member 26, and held in that position by means of the inner wall of the top wall 30 and the rib 38. Further, the barb 28 has been partly extended into the strap 20 after having entered and passed through the upper wall 30.

Figure 8:
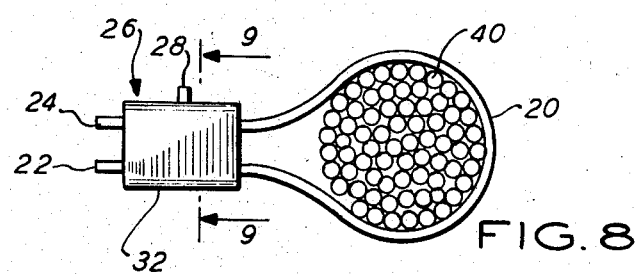
FIG. 8 is a side elevation of a completely assembled bundling strap of the type shown in FIGS. 1 and 2.

The tapered tip portion 22, of the strap 20, is then moved about a plurality of wires or other articles such as 40, shown in FIG. 8, and is returned such as to be placed in the lower channel of the head member 26. The barb 28 is then fully depressed causing it to pass through the tapered tip portion 22 of the strap 20 and thence through the bottom wall 32 of the head member 26. The barb 28 may be proportioned not to extend beyond the head member 26 when assembled or may be made longer and cut to size upon installation as desired.

Turning now to FIG. 9, the relative positions of the strap 20, the head member 26 and the barb 28 in the fully assembled condition are shown. It can be seen from FIG. 9, that the barb 28 has been fully depressed within the head member 26 and extends through the upper wall 30, the end portion of the strap 20, designated 24, end portion 22 of the strap 20 and then through the bottom wall 32 of the head member 26. In this manner the formed loop is locked and cannot be removed without destruction of the strap. With this arrangement the best utilization can be made of the strength and the weakness of the TFE and PTFE materials to form a bundling strap capable of operation under conditions of extreme cold caused by a liquid oxygen environment.

Turning now to FIG. 4, an alternative embodiment of the head member 26 is shown. Head member 26' is similar in construction to head member 26, as shown in FIG. 3, but it includes a web 42 which extends fully from sidewall 34 to sidewall 36 providing noncommunicating channels above and below the intermediate web 42 respectively. In FIG. 5, ribs 44 have been provided in place of the ribs 38, as shown in FIG. 3. Such ribs 44 function in a manner similar to that described with respect to the ribs 38, in FIG. 3, and provide some simplicity in the fabrication of the head member 26.

Figure 1:
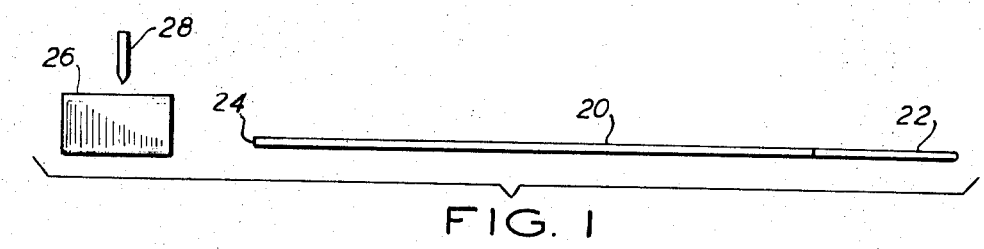
FIG. 1 is a side elevation of a cable bundling strap constructed in accordance with the concepts of the invention and shown in exploded form.
Figure 2:
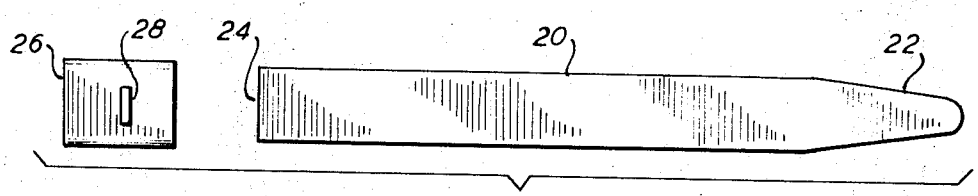
FIG. 2 is a top plan view of the bundling strap of FIG. 1 also shown in exploded form.
Figures 10, 11:
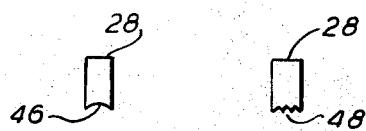
FIG. 10 shows an alternative construction of the metal barb of FIG. 1.
FIG. 11 is a front view of a further embodiment of the metallic barb of FIG. 1.

Turning now to FIGS. 10 and 11, alternative forms of the barb 28 as shown in FIG. 1 is shown. The barb of FIG. 1 is flat with a chisel point. To provide better cutting action, to permit the barb to more easily enter the various portions of the strap 20 and head member 26, the barb 28' may be provided with a curved bottom edge 46 having two points to make cutting simpler. Or as shown in FIG. 11, the bottom edge of barb 28" may bet serrated as shown at 48, thus giving greater ability to cut through the material of the head member 26 and the strap 20.

While there have been shown and described and pointed out the fundamental novel features of the invention as applied to the preferred embodiments, it will be understood that various omissions and substitutions and changes of the form and details of the devices illustrated and in its operation may be made by those skilled in the art, without departing from the spirit of the invention.

The embodiments of the invention in which an exclusive property or privilege is claimed are defined as follows:

1. A bundling strap for holding a plurality of discrete articles in desired positional relationship comprising: strap means having first and second ends and a body portion therebetween; head means having an aperture therethrough: separator means comprising two ribs, each mounted on opposite inner walls of said head means and extending into said aperture, said ribs extending along the length of said head means to separate said aperture into two discrete channels; a first end of said strap means being placed in a first one of said two discrete channels and the body portion of said strap means being placed in the second one of said two discrete channels; and a metal barb locking means passing through two walls of said head means and across said aperture therein and through said strap means in two separate spaced locations whereby said strap means is formed into a loop and retained in said looped form.

2. A bundling strap as defined in Claim 1, wherein said metal barb has a sharpened leading edge to permit it to enter and pass through the material of said strap means and said head means.

3. A bundling strap as defined in Claim 1, wherein said metal barb has a curved and sharpened leading edge to permit it to enter and pass through the material of said strap means and said head means.

4. A bundling strap as defined in claim 1, wherein said metal barb has a serrated leading edge to permit it to enter and pass through the material of said strap means and said head means.

5. A bundling strap for holding a plurality of discrete articles in desired positional relationship comprising: strap means having first and second ends and a body portion therebetween; head means having an aperture therethrough; separator means comprising an intermediate wall extending along the length of said head means and intersecting said aperture to separate said aperture into two discrete channels; a first end of said strap means being placed in a first one of said two discrete channels and the body portion of said strap means being placed in the second one of said two discrete channels; and a metal barb locking means passing through two walls of said head means, said intermediate wall and said aperture in said head means and through said strap means in two separate spaced locations whereby said strap means is formed into a loop and retained in in said looped form.

6. A bundling strap for holding a plurality of discrete articles in desired positional relationship comprising: strap means having first and second ends and a body portion therebetween; head means having an aperture therethrough; separator means comprising two ribs, each rib having two sloped shoulders, one of said ribs being mounted on one of two opposite inner walls of said head means; said ribs extending into said aperture and extending along the length of said head means to separate said aperture into two discrete channels; a first end of said strap means being placed in a first one of said two discrete channels and the body portion of said strap means being placed in the second one of said two discrete channels; and a metal barb locking means passing through two walls of said head means and across said aperture therein and through said strap means in two separate spaced locations whereby said strap means is formed into a loop and retained in said looped form.

References Cited

UNITED STATES PATENTS

| | | |
|---|---|---|
| 881,407 | 3/1908 | Jewett. |
| 2,176,626 | 10/1939 | Gentry _____ 30—168 XR |
| 3,008,208 | 11/1961 | Stephan. |
| 3,147,523 | 9/1964 | Logan. |
| 3,353,227 | 11/1967 | Kabel. |

FOREIGN PATENTS

| | | |
|---|---|---|
| 1,041,178 | 5/1953 | France. |
| 1,212,605 | 10/1959 | France. |
| 985,760 | 3/1965 | Great Britain. |
| 125,565 | 7/1949 | Sweden. |

DONALD A. GRIFFIN, Primary Examiner